Figure 2:
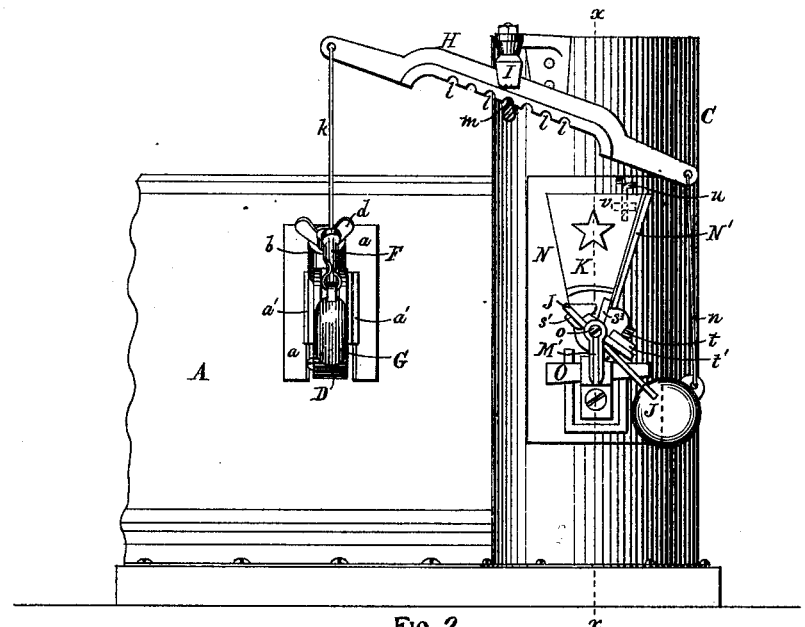

2 Sheets—Sheet 1.

E. D. NORCROSS.
Draft-Regulator for Furnace.

No. 208,759.  Patented Oct. 8, 1878.

WITNESSES:
E. A. Hemmenway.
Benj. Andrews, Jr.

INVENTOR.
Edmund D. Norcross
by N. C. Lombard,
ATTORNEY.

2 Sheets—Sheet 2.
E. D. NORCROSS.
Draft-Regulator for Furnace.
No. 208,759. Patented Oct. 8, 1878.
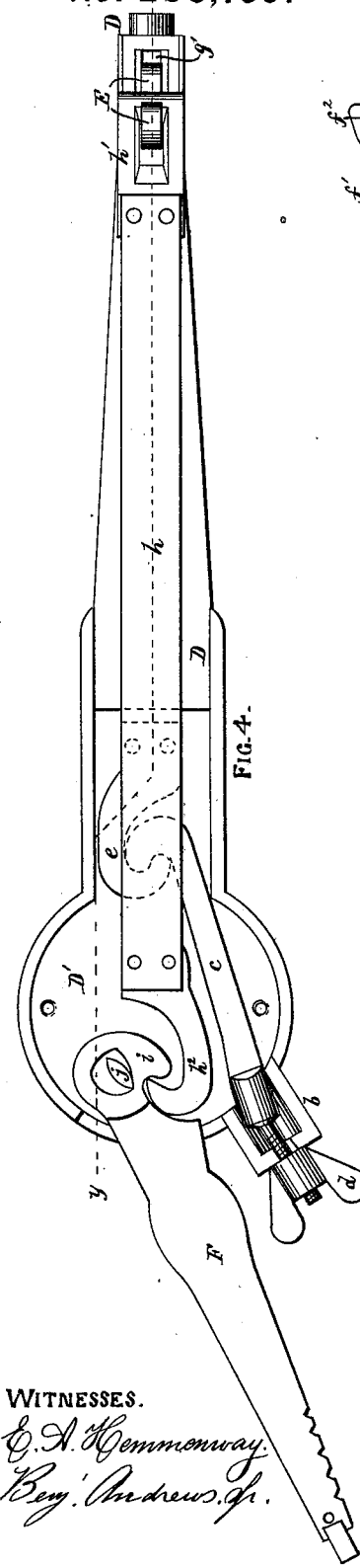
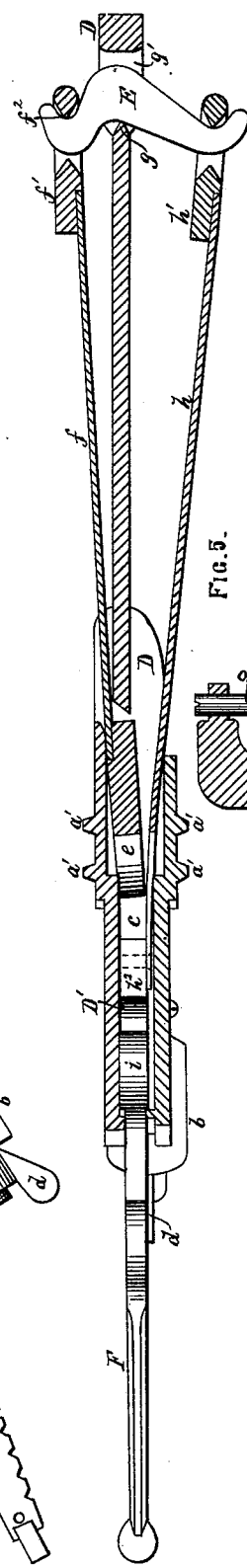
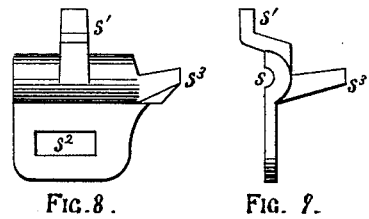
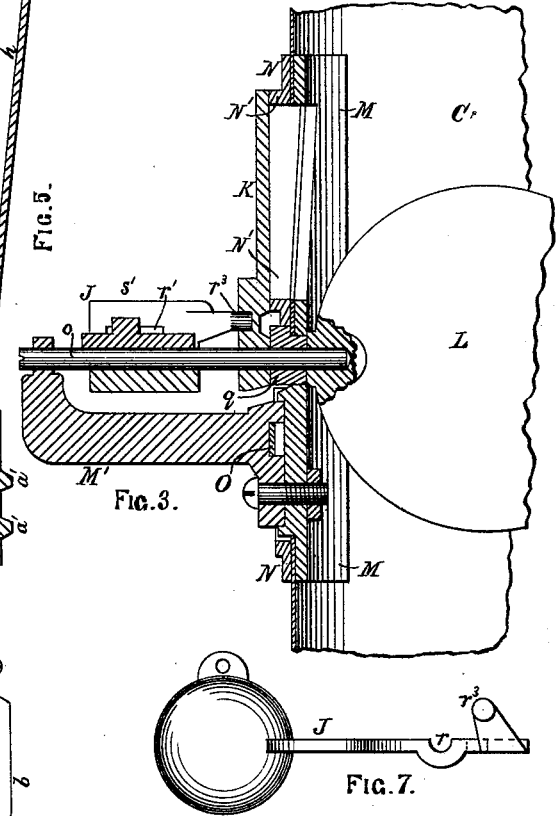
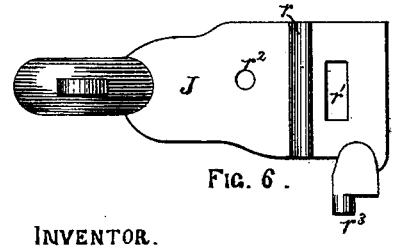
WITNESSES.
E. A. Hemmenway.
Benj. Andrews, Jr.
INVENTOR.
Edmund D. Norcross.
by N. C. Lombard
ATTORNEY.

UNITED STATES PATENT OFFICE.

EDMUND D. NORCROSS, OF CAMBRIDGE, MASSACHUSETTS.

IMPROVEMENT IN DRAFT-REGULATORS FOR FURNACES.

Specification forming part of Letters Patent No. 208,759, dated October 8, 1878; application filed June 22, 1878.

*To all whom it may concern:*

Be it known that I, EDMUND D. NORCROSS, of Cambridge, in the county of Middlesex and State of Massachusetts, have invented certain new and useful Improvements in Draft-Regulators for Furnaces, of which the following, taken in connection with the accompanying drawings, is a specification:

My invention relates to that class of draft-regulators in which the damper is controlled by the unequal expansion and contraction of different metals, and has for its object a more perfect control of the damper and a ready adaptation of the apparatus to varying temperatures; and it consists, first, in a peculiar construction of that portion of the apparatus which is exposed to the heat of the furnace, whereby a much longer movement is obtained by the difference in the expansion or contraction of the different metals, which will be more readily understood by reference to the description of the drawings.

My invention further consists in an improved mode of securing the expansion device to the furnace-casing, whereby screw-bolts are entirely dispensed with, and all trouble from the corrosion of such bolts is avoided.

My invention further consists in mounting the damper within the smoke-flue and the cold-air damper upon the same shaft, so that they shall move together, one being open when the other is closed, and vice versa, while, by a simple adjustment of the operating-lever, the cold-air damper may remain closed, while the damper within the pipe may be acted upon by the expansion-rods to open or close it.

My invention further consists in the use of a lever for operating the hot and cold air dampers, made in two parts, secured together by a locking-lug and a single screw-bolt, and provided with a wrist-pin to engage with the cold-air damper, said lever being adapted to be secured upon the damper-shaft in two different positions for the purpose of engaging with or disengaging from the cold-air damper, as will be described.

My invention further consists in securing the damper-support and the cold-air damper to the smoke-pipe by a key-clamping device, whereby the use of screw-bolts, the threads of which are so likely to corrode, are dispensed with.

My invention further consists in so mounting the cold-air damper relative to its seat or the surface against which it bears when closed that the movement of said damper to open an aperture in the smoke-pipe for the admission of cold air shall be in a plane at a slight angle to the plane of its seat, thereby carrying said damper away from its seat and greatly reducing the friction.

My invention further consists in the use, in combination with a damper and a rod or rods adapted to be expanded and contracted by the varying temperature within the hot-air box of a furnace, of a lever or beam for transmitting the movement caused by the expansion and contraction of said rod or rods to the damper or dampers for the purpose of opening or closing the same, so constructed and arranged upon a knife-edge or pivot that it may be readily and easily adjusted to vary the relative length of said lever or beam projecting from opposite sides of said knife-edge or pivotal bearing for the purpose of effecting a perfect control of the damper, and through it of the fire, so as to regulate the heat according to the state of the atmosphere out of doors.

Figure 1:
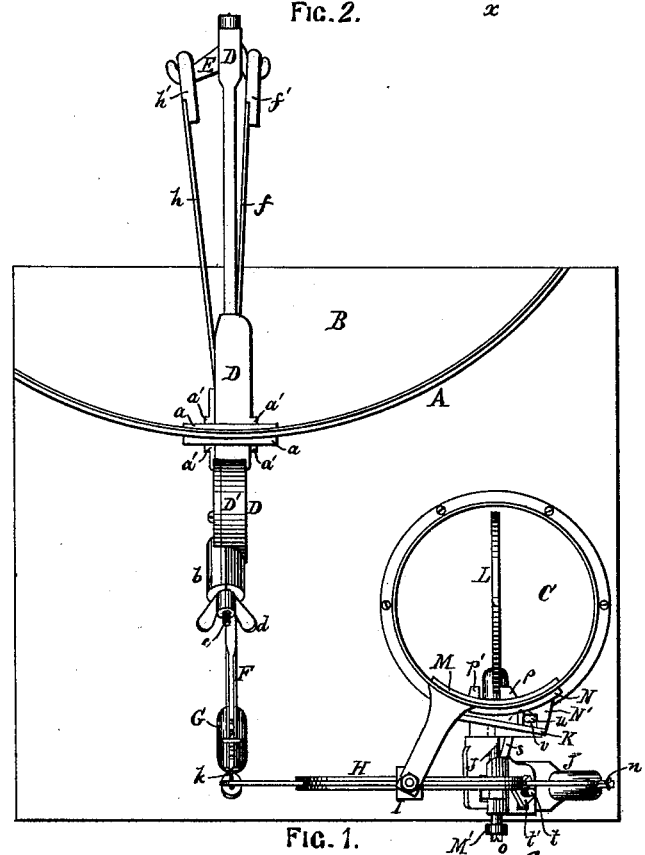

Figure 1 of the drawings is a plan of my improved regulating apparatus. Fig. 2 is an elevation. Fig. 3 is a vertical section of one side of the smoke-pipe on line $x\ x$ on Fig. 2. Fig. 4 is an elevation of the expansion apparatus with one side of the casing removed. Fig. 5 is a section on the crooked line $y\ y$ on Fig. 4. Fig. 6 is a plan of main portion of operating-lever on damper-shaft. Fig. 7 is an edge view of the same, and Figs. 8 and 9 are, respectively, a plan and edge view of the secondary or clamp portion of damper-lever.

A represents a small portion of the outer casing of the furnace, inclosing the hot-air chamber B, and C is the smoke-pipe leading from the furnace to the chimney. (Not shown.) D is an arm of cast-iron, having formed in its outer end the chamber D', (access to which may be had by removing one side of the casing,) and extending horizontally through the side of the furnace-casing A and across, or nearly across, the hot-air chamber above the dome of the fire-pot, said arm being firmly secured to the casing of the furnace without the use of bolts or screws by means of the two forked keys or wedges $a\ a$, made of brass or other suitable metal, and driven between the shell of the furnace and the ribs $a'$ $a'$ on said arm, as shown in Fig. 1.

The arm D is provided at its outer end with the oblique boss $b$, through which projects the shank of the hook $c$, provided with the thumb-nut $d$, by which said hook may be adjusted endwise. The hook $c$ engages with the hook $e$, to one side of which is firmly secured, by rivets or otherwise, the flat thin bar of brass $f$, the opposite end of which is secured in like manner to the casting $f'$, through which is cut a slot to receive one end of the yoke-lever E, said slot being so shaped as to form a knife-edge, $f^2$, to bear against the lever E, as shown in Fig. 5. The lever E is made crooked, so as to form concave points of bearing, two upon one side and one upon the other, the latter forming the bearing upon the knife-edge $g$, formed in the slot $g'$, cut through the inner end of the arm D, and serving as the fulcrum of said lever, the two arms of which are of unequal lengths, as shown in Fig. 5.

Another thin flat bar of brass, $h$, having secured to one end the slotted casting $h^1$, and to the other end the hook $h^2$, engages at one end with the long arm of the lever E, and at the other end with the hook $i$, formed on the inner end of the lever F, which has its fulcrum on the knife-edged pin $j$, as shown in Fig. 4. The lever F has suspended therefrom, so as to be adjustable thereon, the weight G, to insure the downward movement of the outer end of said lever as the bars $f$ and $h$ expand, and is connected at its outer end by means of the wire or rod $k$ with one end of the beam or lever H, provided with a series of notches, $l$, upon its under side, adapted to rest upon the knife-edge $m$, formed in a slot cut through the pendant or hanger I, which in practice will be secured upon the floor-timbers over the furnace at as high a point as practical, in order that the rods $k$ and $n$ may be of sufficient length to permit the necessary movement of the lever H endwise to place either of the notches $l$ upon the knife-edge $m$ without materially affecting the position of the damper. The opposite end of the beam H is connected by the wire or rod $n$ to the weighted lever J secured upon the damper-shaft $o$, upon which is loosely mounted the cold-air damper K, adapted to close the cold-air orifice cut through the side of the smoke-pipe C, and to the inner end of which shaft is rigidly secured the damper L, adapted to close, or nearly close, the smoke-pipe C, and check the draft through the same.

The damper-shaft $o$ has its outer bearing in the bracket M' cast upon or bolted to the curved plate M, fitted to the inner surface of the pipe C, and provided with an aperture for the admission of cold air to said pipe, and lugs $p$ and $p'$ to serve as stops to limit the movement of the damper L in either direction, the inner end of said shaft having a bearing in the bushing $q$, made of brass or other non-corrosive metal.

The plate M and bracket M' are secured to the pipe by placing the plate N upon the outside of the pipe with the bracket M' projecting through an opening in said plate, and driving the key O through a slot in the bracket M' in such a position that it shall serve to draw the two plates toward each other, and thus clamp the shell of the pipe between them.

The plate N has an opening through it corresponding in shape and size to the cold-air aperture in the plate M, around which is formed a projecting ledge, N', to serve as a seat for the cold-air damper K, the plane of said seat being slightly inclined to the plane of motion of the damper K, as shown in Fig. 1.

The damper-lever J is made in two parts, the main portion of which (shown in detail in Figs. 6 and 7) is provided with a transverse groove, $r$, to partially encompass the damper-shaft $o$, an oblong slot, $r^1$, extending transversely thereof, the bolt-hole $r^2$, and the crank-pin $r^3$, adapted to enter a hole in the damper K, as shown in Fig. 3.

The second part of the lever J (shown in detail in Figs. 8 and 9) is also provided with a transverse groove, $s$, corresponding to the groove $r$ on the main portion, with the hook-lug $s^1$, adapted to pass through the slot $r^1$ and hook under the main portion of the lever, as shown in Fig. 2, with the oblong slot $s^2$, and with the upwardly and inwardly projecting arm $s^3$, adapted to bear against the outer face of the damper K to hold it against its seat.

The lever J is secured to the shaft $o$ by placing the main portion beneath the shaft with said shaft resting in the groove $r$, passing the hook-lug $s^1$ through the slot $r^1$, with the groove $s$ resting on the shaft $o$, passing a bolt, $t$, through the hole $r^2$ and slot $s^2$, and screwing down the nut $t'$.

If it is desired to use the cold-air damper K in conjunction with the damper L, the lever J is clamped upon the shaft in such a position that the crank-pin $r^3$ shall engage with the damper K, as shown in Fig. 3, the arm $s^3$ bearing against the outer face of the damper; but if, for any reason, it is desirable to have the damper K remain closed while the damper L is operated, the nut $t'$ is slackened, and the main or under portion of the lever is moved outward till the crank-pin $r^3$ is disengaged from the damper K, when the nut $t'$ is screwed down again, clamping the lever to the shaft $o$ in a new position, the arm $s^3$ still bearing lightly against the damper K, and said damper is secured against accidental displacement by a pin, $u$, passing through the ledge N and through an ear, $v$, on the inner side of the damper K, as shown in dotted lines in Figs. 1 and 2.

In the drawings my improved draft-regulator is shown as applied to a damper in the smoke-pipe for the purpose of controlling the draft through said pipe, but it is obvious that it may be applied to operate a damper for controlling the amount of air admitted beneath the grate without in the least affecting the principles of operation.

The operation of my improved draft-regulator is as follows: The thumb-nut $d$ being adjusted to bring all of the parts of the expansion apparatus connected with the arm D to a rigid bearing, and the lever F raised to its highest position, with the weight G adjusted to the proper point thereon before a fire is built in the furnace, the beam H being adjusted upon its fulcrum to give the proper proportions of length of the two arms thereof to impart to the dampers the necessary movement according to the amount of heat required, and with the damper L wide open and the damper K closed, the apparatus is ready for operation.

A fire being built in the furnace and the air in the hot-air chamber being heated imparts its heat to the bars D, $f$, and $h$, causing them to expand, but in different degrees, as the bar D is made of iron, and the bars $f$ and $h$ are made of brass; and by virtue of the difference of expansion between the brass bars $f$ and $h$ and the iron bar D the hook end of the bar $h$ is moved outward, and the weight G causes the outer end of the lever F to descend, carrying downward with it the left-hand end of the beam H and raising the opposite end, and, acting through the wire or rod $n$, raises the movable end of the weighted lever J, turning the shaft $o$, and with it the damper L, closing or partially closing it and opening or partially opening the damper K, and permitting air to enter the pipe C from the cellar and pass up the chimney.

As the fire is deadened by checking the draft, the bars D, $f$, and $h$ contract and the motions are reversed, and the damper K is closed and the damper L is open.

The peculiar construction of my expansion device gives me great advantages over any draft-regulator heretofore used, so far as my knowledge extends, on account of the wider range of movement which I am enabled to obtain by the expansion and contraction of the bars exposed to the heat of the furnace. This greater movement is obtained as follows, to wit: The brass rod $f$, being hooked to the hook $c$ in the chamber D', is expanded into the hot-air chamber twice as much as the iron bar D, allowing the short arm of the lever E to move in the same direction, while its long arm is drawn by the bar $h$, which also expands twice as much as the bar D, acted upon by the lever F and weight G, toward the chamber D' a distance equal to double the movement of the short arm of said lever relative to the knife-edge, about which it oscillates. As the aggregate length of the two brass bars $f$ and $h$ is twice that of the iron bar D, and as the connection of said bars $f$ and $h$ through the medium of the oscillating lever E, having arms of unequal lengths, in the proportions of two to one, it follows that the hook $h^2$ on the bar $h$ will be moved toward the outer part of the chamber D' a distance four times as great as the expansion of the bar D.

I am aware that draft-regulators have been used in which the expansion and contraction of rods of different metals have been utilized for operating the dampers, and therefore I do not claim, broadly, operating the dampers of a furnace by the difference in expansion and contraction of rods or bars of different metals; but

What I claim as new, and desire to secure by Letters Patent of the United States, is—

1. The combination, in a draft-regulator, of the bar D, made of iron, brass bars $f$ and $h$, and levers E and F, all constructed, arranged, and adapted to operate substantially as and for the purposes described.

2. The combination of the iron bar D, provided with the chamber D', the knife-edge pin $j$, and slot $g$, the hook $c$, adjustably attached to bar D, brass bar $f$, provided with hook $e$ at one end and a slot at the other end, lever E, brass bar $h$, provided at one end with the hook $h^2$ and with a slot at the other end to receive the end of the lever E, and the lever F, provided with the hook $i$, all arranged and adapted to operate substantially as and for the purposes described.

3. The combination, with the casing of a furnace, of the bar D, provided with ribs $a'\,a'$, and the two wedges or keys, arranged and operating substantially as and for the purposes described.

4. The combination, in a draft-regulator, of the damper L, rigidly secured upon the shaft $o$ within the pipe C, the cold-air damper K, mounted loosely upon the same shaft upon the outside of and adapted to close an aperture in the pipe C, and the lever J, securely clamped upon said shaft $o$, and provided with a crank-pin or coupling-lug, $r^3$, and adapted to be readily disengaged from the damper K by moving said lever on its shaft, substantially as described.

5. The lever J, made in two parts, secured together and to the shaft $o$ by means of slot $r^1$, hook-lug $s^1$, bolt $t$, and nut $t'$, and provided with the crank-pin $r^3$ and arm $s^3$, all constructed and adapted to operate substantially as and for the purposes described.

6. In combination with the pipe C, the plate M, having formed thereon or secured thereto the bracket M', projecting outward therefrom through said pipe, the plate N, fitted to the exterior of the pipe, and provided with an opening for the admission of air to the pipe, and secured in position on the pipe and to the plate M by the key O, driven through a slot in the bracket M', substantially as and for the purposes described.

7. In combination with the plate N, provided with an aperture for the admission of air to the draft-pipe and a projecting ledge or seat, against which the damper closes, the damper K, mounted upon the shaft $o$ and adapted to move about its axis in a plane at an angle to the plane of its inner face and the seat against which it closes, substantially as and for the purposes described.

8. In combination with a damper and a rod or rods adapted to be expanded and contracted by the varying temperature within the hot-air chamber of a furnace to impart motion to a lever, the lever or beam H, provided with a series of notches, *l*, and adapted to be supported upon a knife-edge at different distances from its ends, substantially as and for the purposes described.

9. The oscillating beam H, provided with a series of notches, *l*, upon its under side, and adapted to be supported upon the knife-edge *m* at different distances from either end of said lever as a means of regulating the movement of a damper or dampers, substantially as and for the purposes described.

10. The combination, in a draft-regulator, of the iron bar D, provided with the knife-edge *g*, the two brass bars *f* and *h*, each provided with a hook at one end and a knife-edge bearing at the other end, the levers E and F, and the knife-edge *j*, all arranged and adapted to operate substantially as described.

Executed at Boston, Massachusetts.

EDMUND D. NORCROSS.

Witnesses:
E. A. HEMMENWAY,
C. H. DODD.